April 6, 1965 C. V. FREIMAN 3,177,351
AUTOMATIC RECEIVER CONTROL OF UNDETECTED ERROR
Filed Dec. 13, 1961

INVENTOR.
CHARLES V. FREIMAN
BY
Sughrue, Rothwell, Mion, Zinn
ATTORNEYS.

3,177,351
AUTOMATIC RECEIVER CONTROL OF UNDETECTED ERROR

Charles V. Freiman, Pleasantville, N.Y., assignor to International Business Machines Corporation, New York, N.Y., a corporation of New York Filed Dec. 13, 1961, Ser. No. 159,038
6 Claims. (Cl. 235—153)

Figure 1A:
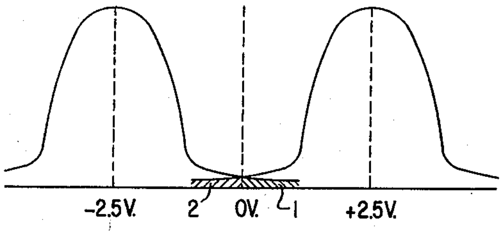

This invention relates to communication systems and more particularly to a receiver which is controlled to reduce the probability of undetected errors.

In many communication systems, the most important measure of reliability is the probability of undetected error. That is, the probability that the signal corresponding to a particular message will be so distorted during transmission that the receiver will interpret it as the signal corresponding to another message. This probability is usually made small only at the expense of reducing the number of signals which the receiver accepts as messages in any given time period. It is common to require that the average number of acceptable received signals per unit time be maximized subject to the condition that the rate of undetected error be not greater than a specified amount.

If the reliability of the channel varies with time and no provision is made to adjust for this variation, then during periods of high reliability the undetected error rate is well below the maximum allowable level and the rate of accepted transmissions is undesirably low. It is desirable then to provide a system which maintains the undetected error rate close to, but below, its maximum allowable value by varying system parameters or components as changes in reliability are detected. In this manner the average rate of accepted transmissions may be improved relative to the fixed system.

Some prior art binary communication systems utilize transmitters which are sufficiently complex to permit variation of the average power per bit, of variation of coding used, or both. In these systems means must be provided by which such flexible transmitters respond to changes in the reliability of the transmission channels. Such systems are not entirely satisfactory for all purposes. In many applications severe restrictions are placed on transmitter size and weight. One example of such an application is in a satellite to earth transmission system. In other applications, for example, a system in which numerous remote terminals are transmitted to one central terminal, transmitter cost makes the use of transmittters having variable power ouputs undesirable. In these situations it is desirable to use a receiver in which the rate of occurrence of undetected errors is controlled.

Accordingly, it is an object of the present invention to provide a communication system in which the operation of the receiver is controlled in accordance with the reliability of the transmission channel so that the rate of undetected errors at the output of the receiver approaches a desired level.

It is another object of the present invention to provide a binary data communication system in which the output of the receiver is compared to a threshold voltage which is varied in accordance with the reliability of the data transmission channel.

It is a further object of the present invention to provide a system in which the number of transmitted errors is monitored and the number of accepted transmissions is varied in accordance with the frequency of transmission error.

Figure 1B:
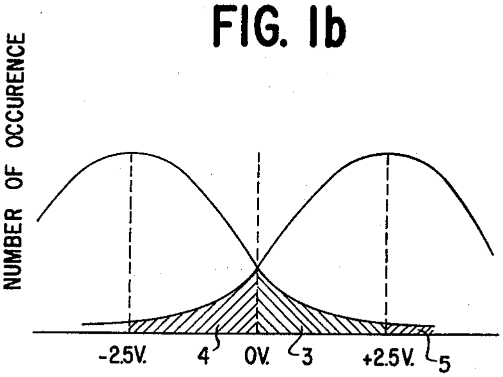

The foregoing and other objects, features and advantages of the invention will be apparent from the following more particular description of a preferred embodiment of the invention as illustrated in the accompanying drawings in which:

FIGURE 1*a* shows probability curves having low variance;

FIGURE 1*b* shows probability curves having high variance; and

Figure 2:
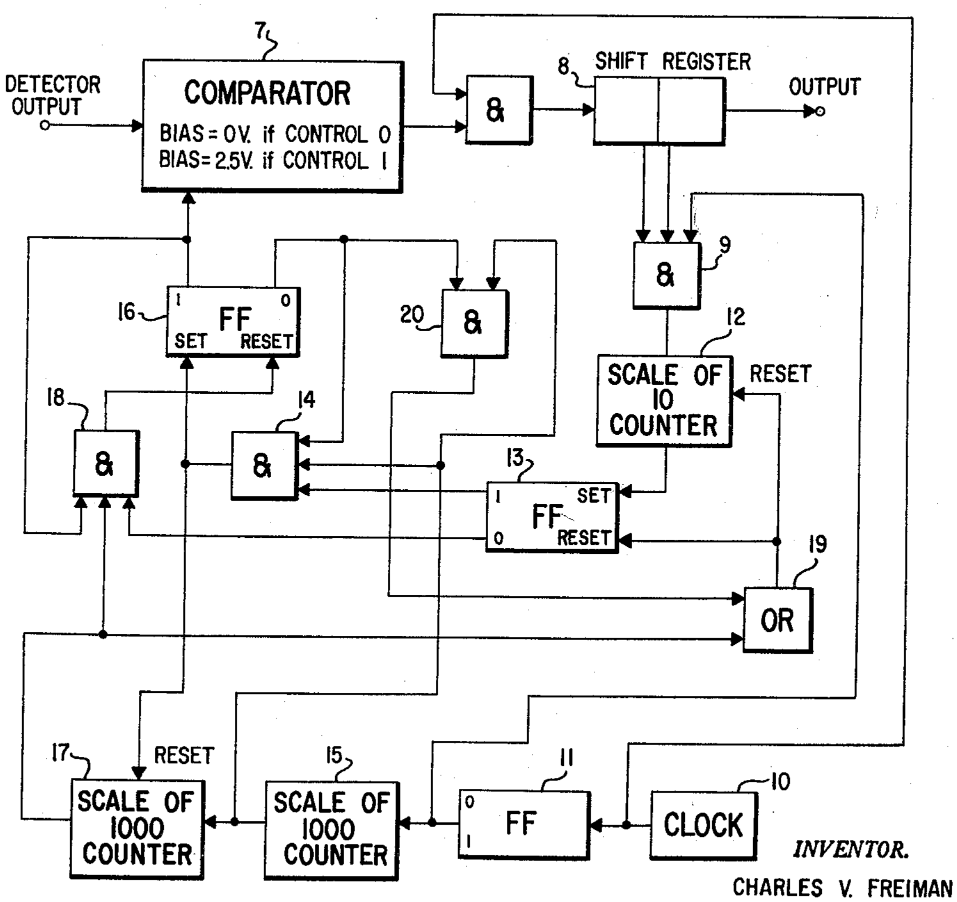

FIGURE 2 is a logic diagram of one embodiment of the invention.

In the communication system of the subject invention a number of different messages are each represented by a unique sequence of binary signals which are transmitted over the binary channel. These binary sequences are referred to as code words. Recently, non-descendent, or chainless, codes have been developed which are particularly suitable for use in data transmission systems. For every pair of code words in these codes, neither code word contains only 1's or only 0's for all positions in which the two code words differ. Thus, 000 and 111 are not non-descendant code words because the code word 000 contains only 0's in all three of the bit positions which differ from the corresponding bit positions of the code word 111. However, the code words 001 and 010 are non-descendant code words because the code word 001 contains a 0 in the second bit position which differs from the second bit position of code word 010; also, the code word 001 contains a 1 in the third position which differs from the third position of the code word 010. The important feature of non-descendant codes which makes them particularly suitable for use in the system of the subject invention is that for a message error to be undetectable, bit errors must affect both transmitted 0's and transmitted 1's. Thus, if the number of errors in transmitting a 0 can be reduced, then the number of undetectable code word errors will be reduced materially.

Good examples of commonly used non-descendant codes are fixed weight codes such as two-out-of-five and four-out-of-eight codes. Also, separable fixed weight codes of low redundancy referred to as "sum" codes, have been developed and are described, for example, in an article by J. M. Berger, "A Note on Error Detection Codes for Asymmetric Channels", in Information and Control, volume 4, No. 1, March 1961. One example of a "sum" code is a code having the property that redundant bits are added to the code word in accordance with the binary representation of the number of 0's in the message bits. One example of a "sum" code containing three message bits and two redundant bits is given below:

*Table I*

| Code Word | Message Bits | | | Redundant Bits | |
|---|---|---|---|---|---|
| | [1] 1 | [1] 2 | [1] 3 | [1] 4 | [1] 5 |
| One | 0 | 0 | 0 | 1 | 1 |
| Two | 0 | 0 | 1 | 1 | 0 |
| Three | 0 | 1 | 0 | 1 | 0 |
| Four | 1 | 0 | 0 | 1 | 0 |
| Five | 0 | 1 | 1 | 0 | 1 |
| Six | 1 | 0 | 1 | 0 | 1 |
| Seven | 1 | 1 | 0 | 0 | 1 |
| Eight | 1 | 1 | 1 | 0 | 0 |

[1] Bit position.

Study of the above table will readily show that the coding system includes eight code words which have been arbitrarily designated as one, two, three, . . . eight. Code word one includes the message bits 000 and the abundant bits 11 representing the total number of 0's in the message bits; in this case there are three 0's in the message bits and the redundant bits are the binary representation of this number of 0's. Note that without the redundant bits the code words would not be non-descendant. A comparison of code words one and two illustrates this non-descendant property. Considering only the message bits, code words one and two differ only in bit position 3. However, considering the message bits and the redundant bits, code words one and two differ in bit positions 3 and 5. Moreover, code word one contains a 0 in bit position 3 and a 1 in bit position 5. Therefore, code word one will be mistaken for code word two only if bit 3 is transmitted as a 1 and bit 5 is transmitted as a 0. It is this property of non-descendant codes, and particularly "sum" codes, which makes them particularly suitable for use in the subject system.

This system will be described in conjunction with a simple two message code in which one code word is represented by the binary sequence 01 and the other code word is represented by the binary sequence 10. It will, of course, be understood that the system can be suitably modified for use with more complicated codes such as the code shown in Table 1 and even more complex coding systems.

The data transmission system is synchronous with positive pulses representing 1's and negative pulses representing 0's. In the absence of noise, the detector output at clock times is +2.5 volts when 1's are transmitted and −2.5 volts when 0's are transmitted. Under normal channel conditions, the noise present in the detector output is an independent, normally distributed, random variable of mean 0 volts and having a low variance. This can best be seen with reference to FIGURE 1*a* showing two normally distributed probability curves of small variance and having means of −2.5 volts and +2.5 volts. FIGURE 1*a* shows that under normal channel conditions when a 0 is transmitted, the probability is quite high that the output of the detector will be close to −2.5 volts. Similarly, when a 1 is transmitted the probability is quite high that the output of the detector will be +2.5 volts. In this instance it is desirable to bias the detector so that when the output is greater than a threshold value of 0 volts, the detector output is considered to be a 1 and when the output is less than 0 volts, the detector output is considered to be a 0. If this is done, the probability of a transmitted 0 being detected as a transmitted 1 is represented by the shaded area under the probability curve and designated as 1. Similarly, the probability of a transmitted 1 being detected as a 0 is represented by the shaded area under the probability curve and designated as 2. The probability of one code word being mistakenly detected as another code word, that is the probability of a 1 being detected as a 0 and a 0 being detected as a 1, is the product of the two probabilities represented by the shaded areas in FIGURE 1*a*. This probability is quite small and is acceptable. However, when the channel becomes noisy due to transmission difficulties, the variance of the two probability curves increases. Two probability curves with larger variances are shown in FIGURE 1*b*. In this instance the probability of an undetected message error is the product of the probabilities represented by the shaded areas 3 and 4. It can be seen that this probability is quite large and may be unacceptable in that an undesirably large number of message errors are undetected. The system of this invention reduces the probability of an undetected message error by raising the threshold voltage of the detector when the channel is noisy. For example, if the threshold is raised to +2.5 volts, then the probability that a transmitted 0 is detected as a 1 is represented by the shaded area 5 under the probability curve. This probability is quite small. Since the probability of an undetected error is the product of this probability and the probability of a transmitted 1 being detected as a 0, the product is small and the probability of an undetected error is within acceptable limits.

In the present system we will assume that the channel noise has a variance of either 1 volt$^2$ or 1.75 volts$^2$ depending on atmospheric conditions. As is valid for broadband pulsed microwave systems we assume signal plus noise additivity. In this system a threshold of 0 volts is used when the noise variance is found to be 1.0 and a threshold of 2.5 volts is used when the noise variance is found to be 1.75. The probabilities of the two types of bit error are found in Table 2 below.

*Table 2*

| Threshold Setting | Noise Variance | Transmitted Bit | |
|---|---|---|---|
| | | 0 | 1 |
| 0.0 | 1.00 | $6.2\times10^{-3}$ | $6.2\times10^{-3}$ |
| 2.5 | 1.75 | $8.0\times10^{-5}$ | 0.5 |
| 0.0 | 1.75 | $29.4\times10^{-3}$ | $29.4\times10^{-3}$ |
| 2.5 | 1.00 | $2.9\times10^{-7}$ | 0.5 |

The probability of one of the code words 01 or 10 being detected in error is then a function of the product of the two probabilities in each row of Table 2. The percent of accepted transmissions which are undetected errors is given in Table 3 below.

*Table 3*

| Noise Variance | Threshold Setting | |
|---|---|---|
| | 0.0 | 2.5 |
| | *Percent* | *Percent* |
| 1.0 | .004 | .00003 |
| 1.75 | .09 | .008 |

From the above table it is seen that under normal channel conditions the rate of undetected errors is close but less than 1 in $10^5$. The rate is undesirably high when noise variance is 1.75 and threshold voltage is 0.0, and undesirably low, because of corresponding low rate of accepted messages, when noise variance is 1.0 and the threshold voltage is 2.5.

Referring to FIGURE 2, there is shown a comparator 7 having an adjustable threshold. The comparator 7 produces an output indicative of a binary 0 if the detector output is less than the threshold voltage and produces an output indicative of a binary 1 if the detector output is greater than the threshold voltage. In the subject system we assume that the comparator has a threshold which is adjustable to 0 volts or to 2.5 volts. This comparator may be any one of a number of well known circuits. One example of a suitable circuit is a monostable multivibrator which is triggered to its astable state if the input triggering pulse is greater than the threshold. The multivibrator output would then indicate a binary 1 for a time period which is less than the clock pulse period; that is the multivibrator must be returned to its stable state before the next clock pulse. The outputs of the comparator 7 are set into a shift register 8 by the clock pulses. Since the code words used in the subject system have only two bits, a two-position shift register is shown. In this system the occurrence of the error word 11 will be used to evaluate the channel condition. The number of times that this error message is received is indicative of the channel reliability. An AND circuit 9 is provided to detect the occurrence of the error word 11.

The AND gate 9 is sampled by every other clock pulse so that complete messages will be decoded. Pulses from the clock 10 trigger the flip-flop 11 so that at even clock pulse times the AND gate 9 is enabled.

The output of AND gate 9 advances a scale of ten counter 12. If the scale of ten counter 12 receives ten inputs before it is reset, the output of the counter 12 sets the flip-flop 13 to its 1 condition. When flip-flop 13 is set, the AND gate 14 is enabled. The even clock pulses from flip-flop 11 are fed to a scale of 1,000 counter 15 which, when it has advanced through all its stages, also enables AND gate 14. Whenever this occurs and control flip-flop 16 is in its 0 condition, the output of AND gate 14 sets the control flip-flop 16 to its 1 condition. The output of control flip-flop 16 then changes the bias on comparator 7 from 0 volts to 2.5 volts. Note that the output of AND gate 14 also resets the scale of 1000 counter 17.

Provision is also made to reset the flip-flop 13, the scale of ten counter 12 and the control flip-flop 16. The output of the scale of 1000 counter 15 is connected to advance the scale of 1000 counter 17. When the scale of 1000 counter 17 advances through a complete cycle, the output acts through AND gate 18 to reset the flip-flop 16. The AND gate 18 is enabled only when the control flip-flop 16 is in the 1 condition and the flip-flop 13 is in the 0 condition. The output of the scale of 1000 counter 17 also passes through OR gate 19 to reset the scale of ten counter 12 and the flip-flop 13. Otherwise the reset of the scale of ten counter 12 and the flip-flop 13 is from the AND gate 20 which is enabled by the output of the scale of 1000 counter 15 whenever the control flip-flop 16 is in the 0 condition, through OR gate 19 to the scale of ten counter 12 and the flip-flop 13.

The expected rate of occurrence of the error word 11 is shown in Table 4 below.

*Table 4*

| Noise Variance | Threshold Setting | |
|---|---|---|
| | 0.0 | 2.5 |
| 1.00 | $6.6\times10^{-3}$ | $1.4\times10^{-7}$ |
| 1.75 | $28.5\times10^{-3}$ | $400\times10^{-7}$ |

In the circuit of FIGURE 2 the threshold of the comparator 7 is switched from 0 volts to 2.5 volts if the error word 11 occurs ten times in a block of 1000 code words received; that is if the scale of ten counter 12 is cycled once during the time that the scale of 1000 counter 15 is cycled. If the system transmits $10^6$ code words without the occurrence of ten error words 11, the comparator is reset to a bias of 0 volts. That is, if the scale of 1000 counter 15 and the scale of 1000 counter 17 are cycled without the scale of ten counter 12 being cycled, the control flip-flop 16 is reset to change the control voltage to 0 volts. The occurrence rates at which the threshold settings are changed in the system of FIGURE 2 are not exactly the occurrence rates shown in Table 4. However, the occurrence rates at which threshold changes are made is influenced by engineering expediency and by the fact that higher error rates are considered more serious than lower acceptance rates.

While the system has been described in conjunction with a channel having only two distinct noise variances and a comparator having only two threshold settings, it will, of course, be understood that one skilled in the art could adapt the system to multiple threshold settings or a continuously varying threshold setting made in accordance with the continuously varying conditions of the transmission channel.

While the invention has been particularly shown and described with reference to a preferred embodiment thereof, it will be understood by those skilled in the art that various changes in form and details may be made therein without departing from the spirit and scope of the invention.

What is claimed is:

1. In a system for maintaining error and acceptance rates of transmission of non-descendant code words from a source to a receiver, over a channel having a variable reliability; a comparator having an input connected to said receiver and an output, said comparator being adapted to produce signals at its output in response to input signals from said receiver and including variable threshold-voltage means to block the response of said comparator to input signals below a predetermined threshold voltage, means for monitoring the output of said comparator for detection of the relative rate of issuance of erroneous and acceptable code words therefrom, means responsive to said last named means for adjusting said variable threshold-voltage means, to vary said predetermined threshold voltage in dependence upon said relative rate, said means for varying said predetermined threshold voltage including a bistable device, the output of said bistable device being connected to said comparator, said bistable device establishing a first threshold voltage in said comparator when said bistable device is in one of its stable states and a second threshold voltage in said comparator when said bistable device is in the other stable state, said means for determining the relative rate of issuance of erroneous and acceptable code words from said comparator being connected to the input to said bistable device, said bistable device being switched to one stable state when said relative rate exceeds a first predetermined level and being switched to the other stable state when said relative rate is below a second predetermined level.

2. In a system for maximum rate of information transfer from a transmitter to a receiver, subject to maximum allowable undetected error rate, utilizing code words of a binary non-descendant code, a comparator having an input connected to said receiver and an output, said comparator including variable threshold means to control its response to signals from said receiver and producing at its output a first binary representation if a signal received thereby exceeds said threshold voltage and a second binary representation if said received signal is less than said threshold voltage; means for monitoring the output of said comparator to determine the rate of occurrence at said receiver of code words which do not correspond to code words of said non-descendant code, said monitoring means including means for determining the rate at which an excess number of one of said binary representations per word occurs when said threshold voltage means is at a normal position, said one binary representation being the same for the test of each successive word received, setting means responsive to an indication by said rate determining means of a rate higher than a prescribed maximum, for adjusting said threshold voltage means in the direction to reduce the rate at which an excess number of said one binary representations per word occurs, said monitoring means also including means responsive to an indication by said rate determining means of a rate lower than a prescribed minimum to restore said setting means, to return said threshold voltage means to the normal position.

3. A system for maintaining the error and acceptance rates of received signals forming binary non-descendant code words at desired levels, comprising a comparator, a souce of variable threshold voltage, said threshold voltage and said received signals being applied to said comparator, said comparator producing a first binary output if a signal received thereby exceeds said threshold voltage and a second binary output if said received signal is less than said threshold voltage, means for determining the error rate of said received code words, said last-named means including a decoder, said received code words being fed by said comparator to said decoder, said decoder producing an output indicative of invalid code words, a first counter, the output of said decoder being connected to advance said first counter, a second counter, means for advancing said second counter at a rate proportional to the rate at which received code words are applied to said comparator, and means responsive to the relative conditions of said first and second counters for changing said variable threshold voltage.

4. A system for maintaining the error and acceptance rates of received signals forming binary non-descendant code words at desired levels, comprising a comparator, a source of variable threshold voltage, said threshold voltage and said received signals being applied to said comparator, said comparator producing a first binary output if a signal received thereby exceeds said threshold voltage and a second binary output if said received signal is less than said threshold voltage, means for determining the error rate of said received code words, said last-named means including a decoder, said received code words being fed by said comparator to said decoder, said decoder producing an output indicative of invalid code words, a first counter, the output of said decoder being connected to advance said first counter, a second counter, means for advancing said second counter at a rate proportional to the rate at which received code words are applied to said comparator, and means responsive to the relative conditions of said first and second counters for changing said variable threshold voltage, said last-mentioned means including a bistable device, the output of said bistable device being connected to said comparator, said bistable device applying a first threshold voltage to said comparator when said bistable device is in one stable state and a second threshold voltage when said bistable device is in the other stable state, and means responsive to the relative conditions of said first and second counters for switching the stable state of said bistable device.

5. A system for maintaining the error and acceptance rates of two received code words 01 and 10 at desired levels, comprising a receiver, a comparator, the output of said receiver being connected to said comparator, said comparator producing an output indicative of a binary 1 if the output of said receiver exceeds a predetermined threshold voltage, said comparator producing an output indicative of a binary 0 if the output of said receiver is below a predetermined threshold voltage, means connected to the output of said comparator for detecting the presence of the error code word 11, a counter, the output of said last-named means being connected to advance said counter, a second counter, means for advancing said second counter at a rate dependent upon the rate at which the code words are received, and means responsive to the relative rate of advancement of said first and second counters for varying said threshold voltage.

6. The system recited in claim 5, wherein the means for varying said threshold voltage includes a bistable device, the output of said bistable device being connected to said comparator, said bistable device applying a first threshold voltage to said comparator when said bistable device is in one stable state and a second threshold voltage when said bistable device is in the other stable state, and means responsive to the relative rate of advancement of said first and second counters for switching the stable state of said bistable device.

References Cited by the Examiner

UNITED STATES PATENTS

| | | | |
|---|---|---|---|
| 3,036,290 | 5/62 | Zarouni | 235—153 XR |
| 3,078,443 | 2/63 | Rose | 235—153 XR |

FOREIGN PATENTS

| | | |
|---|---|---|
| 586,284 | 3/47 | Great Britain. |

MALCOLM A. MORRISON, *Primary Examiner.*